US008428573B2

(12) United States Patent
Martz et al.

(10) Patent No.: US 8,428,573 B2
(45) Date of Patent: Apr. 23, 2013

(54) REMOTE CONTROL OF MOBILE RADIO SYSTEM THROUGH PORTABLE RADIO SYSTEM

(75) Inventors: Donald Martz, Webster, NY (US); David Hinterberger, Fairport, NY (US); Eric Van Ness, Macedon, NY (US)

(73) Assignee: Harris Corporation, Melbourne, FL (US)

( * ) Notice: Subject to any disclaimer, the term of this patent is extended or adjusted under 35 U.S.C. 154(b) by 385 days.

(21) Appl. No.: 12/614,801

(22) Filed: Nov. 9, 2009

(65) Prior Publication Data
US 2011/0111791 A1 May 12, 2011

(51) Int. Cl.
*H04M 3/00* (2006.01)
(52) U.S. Cl.
USPC ........ 455/419; 455/517; 455/445; 455/552.1; 455/90.2
(58) Field of Classification Search ............... 455/426.2, 455/445, 516–521, 550.1, 90.1, 90.2, 410–411, 455/418–420, 552.1
See application file for complete search history.

(56) References Cited

U.S. PATENT DOCUMENTS

| | | | |
|---|---|---|---|
| 4,700,375 A | 10/1987 | Reed | |
| 5,870,149 A * | 2/1999 | Comroe et al. | ............... 348/474 |
| 5,913,163 A | 6/1999 | Johansson | |
| 6,141,540 A | 10/2000 | Richards et al. | |
| 6,215,474 B1 | 4/2001 | Shah | |
| 6,374,091 B1 | 4/2002 | Richards et al. | |
| 6,415,158 B1 | 7/2002 | King et al. | |
| 6,449,499 B1 | 9/2002 | Ishikura et al. | |
| 6,542,758 B1 | 4/2003 | Chennakeshu et al. | |
| 6,850,738 B2 | 2/2005 | Nokkonen et al. | |
| 6,882,870 B2 | 4/2005 | Kivela et al. | |
| 7,076,675 B2 | 7/2006 | Martinez Perez et al. | |
| 7,280,807 B2 | 10/2007 | Nguy et al. | |
| 2004/0127214 A1 * | 7/2004 | Reddy et al. | ............... 455/426.2 |
| 2006/0046756 A1 | 3/2006 | Kies | |
| 2007/0065357 A1 | 3/2007 | Chien | |
| 2007/0142072 A1 | 6/2007 | Lassally | |

(Continued)

FOREIGN PATENT DOCUMENTS

JP 2001320298 A 11/2001
WO WO-2004032536 A2 4/2004

(Continued)

OTHER PUBLICATIONS

Martz, D., et al., U.S. Appl. No. 12/841,530, filed Jul. 22, 2010, entitled "Multi-Mode Communications System".

(Continued)

*Primary Examiner* — Marcos Torres
(74) *Attorney, Agent, or Firm* — Fox Rothschild, LLP; Robert J. Sacco (57) ABSTRACT

A radio communications system (100) includes a portable radio (200) and a mobile radio (300), the portable radio (200) being configured to remotely control the mobile radio (300). The portable radio (200) can operate in a standalone mode, in which the mobile radio (300) communicates with other radio devices using the portable radio's RF interface (285). The portable radio (200) can also operate in a remote mode, in which the portable radio (200) is operative to establish a wireless link between the portable radio (200) and the mobile radio (300) to thereby remotely control the mobile radio (300) and to use the mobile radio's RF interface (385) to communicate with other radio devices.

20 Claims, 4 Drawing Sheets

U.S. PATENT DOCUMENTS

| | | |
|---|---|---|
| 2007/0225049 A1 | 9/2007 | Andrada |
| 2008/0057893 A1 | 3/2008 | Patla |
| 2008/0200208 A1 | 8/2008 | Llanos et al. |
| 2008/0318639 A1 | 12/2008 | Crestol |
| 2009/0088151 A1 | 4/2009 | Karabinis |
| 2009/0291646 A1* | 11/2009 | Ong et al. .................... 455/90.2 |
| 2011/0111791 A1 | 5/2011 | Martz et al. |

FOREIGN PATENT DOCUMENTS

| | | |
|---|---|---|
| WO | WO-2004057891 A1 | 7/2004 |
| WO | 2006125043 A1 | 11/2006 |
| WO | 2010006650 A1 | 1/2010 |
| WO | 2011056746 A1 | 5/2011 |

OTHER PUBLICATIONS

Anonymous: "RF-7800R-RC Universal Remote Control System" [online], Jun. 30, 2009, p. 2PP, XP002618884 [retrieved on Jan. 26, 2011]. Retrieved from the Internet: <URL: http://www.rfcom.harris.com/media/RF-7800R-RC%20Universal%20Remote%20Control%20System_tcm26-12078.pdf>.

Harris Corporation, International Search Report mailed Feb. 25, 2011; International Application No. PCT/US2010/054946.

Wei, Hung-Yu, et al., "Two-Hop-Relay Architecture for Next Generation WWAN/WLAN Integration", IEEE Wireless Communications, IEEE Service Center, Piscataway, NJ, US, vol. 11, No. 2, Apr. 1, 2004, pp. 24-30.

"Nokia 6110 User's Guide, 9351506, Issue 2", Electronic User's Guide Released Subjet to Nokia's User's Guides Terms and Conditions, xx, xx, Jun. 7, 1998, pp. 1-65.

Harris Corporation, International Search Report mailed Nov. 7, 2011, Application Serail No. PCT/US2011/041798.

* cited by examiner

REMOTE CONTROL OF MOBILE RADIO SYSTEM THROUGH PORTABLE RADIO SYSTEM

BACKGROUND OF THE INVENTION

1. Statement of the Technical Field

The invention is directed to a mobile/portable radio system. In particular, the invention is directed to a system including a fully functional portable radio that can also remotely control a separate mobile radio.

2. Description of the Related Art

Land Mobile Radio (LMR) systems are in widespread use across the world. These systems are often used by fire, police, and other first responder organizations for communication between organization members. LMR systems are also used by many commercial organizations to dispatch and communicate with vehicles and people. LMR systems often include one or more central dispatch offices, but individuals can also communicate with one another without the assistance of a dispatch office.

LMR systems typically provide point-to-multipoint communications between members of a group using the system. A channel is selected by the user to determine the radio frequency that the LMR device will operate at. Transmission and reception may occur at the same frequency. Alternatively, the selected channel may define separate transmit and receive frequencies. A push-to-talk (PTT) button is pressed on the radio equipment to open communication on a selected channel. A user can then transmit a message, typically in the form of voice, on the selected channel. Any members of the group that are monitoring the selected channel will receive the message. The message can also be in the form of data entered with a keyboard or dual tone multi frequency (DTMF) keypad.

One or more repeaters are often included in the communication system to allow users distributed over a wide geographical area to communicate with one another. A repeater receives a signal and retransmits it at a higher power, thus increasing the range of the communication system. Although repeaters are often used, LMR equipment can also operate in "talk-around" mode, which allows two or more devices to communicate without the use of a repeater.

More modern systems use a trunking protocol that allows multiple users and groups to share a single frequency channel. In a trunked system, a repeater or base station provides a control channel that individual devices monitor to determine which frequency bands to monitor and transmit on at any given moment. This protocol allows multiple talk groups to share the same frequency band without interfering with one another.

LMR equipment that is installed in a vehicle is usually referred to as a mobile radio. Because a mobile radio is powered by the vehicle's power system, battery life is generally not a concern. Therefore, mobile radios can transmit at a high power level. Mobile radios also generally have a large antenna attached directly to the vehicle to improve transmission and reception efficiency. Mobile radios may also include multiple antennas, e.g., diversity antenna structures, that increase transmission and reception reliability. However because mobile radios are fixed in a vehicle, they cannot be used by a user, e.g., a police officer, when the user is not in the vehicle.

LMR equipment that can be carried by an individual user is referred to as a portable radio. A portable radio is usually sized so as to be easily carried by a user. Portable radios are typically powered by a small rechargeable battery. Accordingly, battery life is a concern and portable radios are generally designed to transmit at a lower power than mobile radios. Additionally, due to size constraints, portable radios typically have smaller antennas than mobile radios and rarely accommodate multiple antennas. The operating range of a portable radio is therefore generally more limited than that of a mobile radio.

To overcome the range limitations associated with portable LMR equipment, a number of techniques have been developed. A simple RF repeater is sometimes used. The repeater, which is usually installed in a vehicle, amplifies the RF signals transmitted to and from the portable radio. This system has the advantage that it increases the range of the portable radio. Additionally, the portable radio may connect through a wired interface to a mobile radio to take advantage of the higher power transmitter of the mobile radio. Although these systems overcome some of the limitations of the portable radio, they require that the user physically have access to the mobile radio to change parameters such as the channel number and the RF power level.

Kenwood, a manufacturer of portable, mobile, and fixed location radios, has introduced a radio system known as Sky-Command that allows a portable radio to remotely control a High Frequency (HF) radio. However, the portable radio includes only a single radio interface that is used both for standalone communications and remote control of the HF radio. Thus, the portable radio must be either used as a remote control or a standalone radio and cannot seamlessly switch between the two modes of operation. Additionally, the communications link between the portable radio and the HF radio includes only rudimentary security features, such as the use of Continuous Tone-Coded Squelch System (CTCSS).

Similarly, to overcome the limitations of the mobile radio, simple remote control units have been developed. These units communicate with the mobile radio when the remote control is near to the vehicle. This provides the user with a limited level of mobility and allows the user to communicate even when not in the vehicle. However, these remote controls must be close to the vehicle to operate. When the remote control is too distant from the mobile radio, the user is unable to communicate. This is a significant limitation for users who need to leave the area of the mobile radio to perform their duties.

Therefore, there is need in the art for a radio system that provides robust security that allows a user to take advantage of the increased transmission range of a mobile radio when near the mobile radio but also allows the user seamlessly retain his or her ability to communicate even when distant from the mobile radio. The present invention satisfies these and other needs.

SUMMARY OF THE INVENTION

According to an aspect of the invention a radio communications system is provided that includes at least a portable radio and a mobile radio. The portable radio is a fully functional handheld radio that also can act as a remote control for the mobile radio. The portable radio includes a controller, e.g., a microprocessor, an RF interface, a local wireless interface, and input/output devices, e.g., a speaker and microphone. Similarly, the mobile radio also includes a controller, an RF interface, a local wireless interface, and input/output devices.

The portable radio can operate in either a standalone mode or a remote mode. When operating in the standalone mode, the portable radio is a self contained fully functional radio. The portable radio's controller takes inputs from a user and transmits those inputs to other LMR devices using the portable radio's RF interface. For example, audio data may be recorded using the microphone and transmitted to other LMR devices. Similarly, data received from other LMR devices through the portable radio's RF interface is presented to the user. For example, audio data received from another LMR device may be presented to the user through the speaker.

The portable radio is also capable of operating in a remote mode. In order to operate in the remote mode, the portable radio first establishes a wireless link to the mobile radio via the local wireless interface. Establishing a wireless link to the mobile radio may include authentication procedures. Additionally, once a connection is established, data transmitted between the mobile radio and the portable radio via the wireless link may be encrypted. The wireless link may be established using the Bluetooth® protocol, which provides authentication and encryption features.

Once a wireless link is established, the portable radio can communicate with the mobile radio to remotely control parameters associated with the mobile radio. For example, the mobile radio may be able to modify the channel that the mobile radio uses to transmit data via the mobile radio's RF interface. Additionally, the portable radio can use the mobile radio's more powerful RF interface to transmit data provided by the user of the portable radio. Data received by the mobile radio's RF interface can also be forwarded to the portable radio via the wireless link to be presented to the portable radio's user. Typically, when in remote mode the portable radio disables its own RF interface to conserve power. Because the portable radio's local wireless interface typically uses less power than the portable radio's RF interface, by remotely controlling the mobile radio, the portable radio can increase both its transmission range and the available talk time.

A user of the mobile radio may still be able to transmit and receive data using the mobile radio's RF interface even when the mobile radio is being remotely controlled by the portable radio. This allows a user of the mobile radio to share the mobile radio's RF interface with the user of the portable radio. Data sent by the user of the mobile radio to other LMR devices via the mobile radio's RF interface may also be sent to the portable radio via the wireless link to allow the user of the portable radio to monitor transmissions made by the user of the portable radio. Additionally, multiple portable radios may establish wireless links to the mobile radio to allow the multiple portable radios to share the mobile radio's RF interface simultaneously.

DESCRIPTION OF THE DRAWINGS

Embodiments will be described with reference to the following drawing figures, in which like numerals represent like items throughout the figures, and in which.

DETAILED DESCRIPTION

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Figure 1:
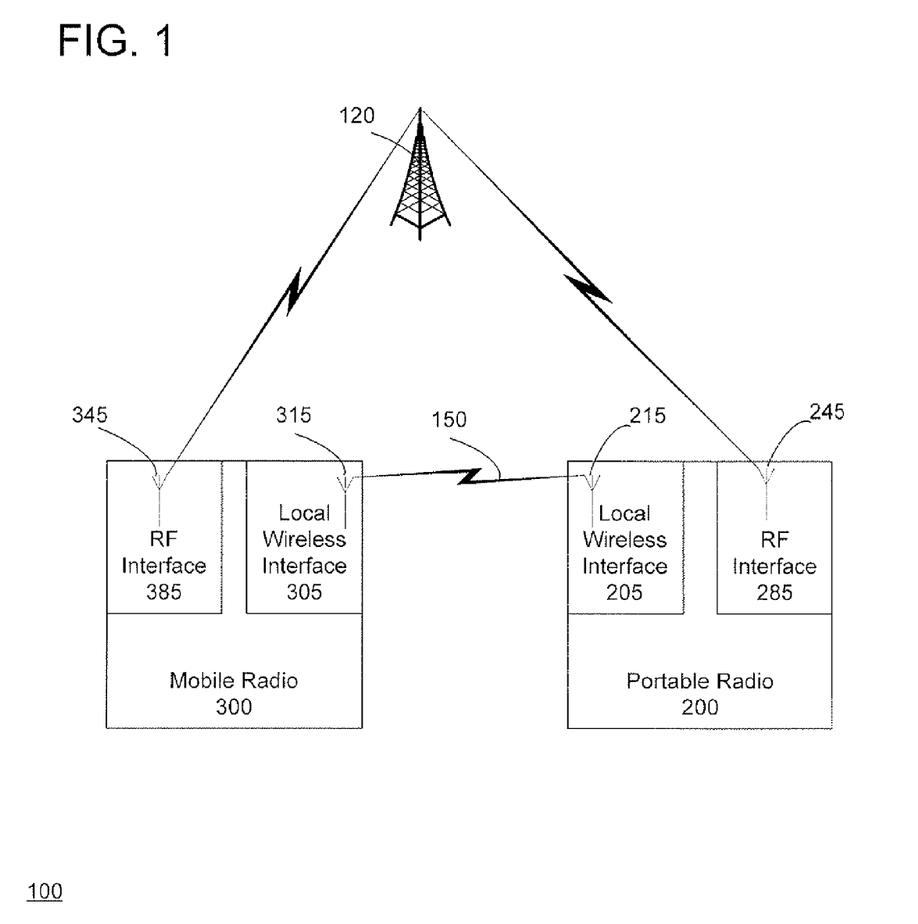
FIG. 1 is a block diagram of a communication system including a mobile radio and a portable radio according to an embodiment of the invention.

Referring now to FIG. 1, there is provided a block diagram of a communication system in accordance with an embodiment of the present invention. As shown in FIG. 1, the communication system 100 includes a mobile radio 300, a portable radio 200, and a repeater 120. The repeater 120 can be a simple wireless repeater that merely amplifies the RF signals received from LMR devices, or a more complicated repeater or base station providing trunked functionality. The mobile radio 300 is typically installed in a vehicle and is powered by either the vehicle's main battery or a separate auxiliary power source. The portable radio 200 is typically a handheld device that is powered by small rechargeable or disposable batteries. The repeater 120 is not required for the system to operate because both the portable radio 200 and the mobile radio 300 can communicate with other LMR devices without the use of a repeater. Portable radio 200 and mobile radio 300 can also communicate with a base station, not shown in the figures. The communication with the base station can occur through the repeater 120 or without the use of the repeater.

The portable radio 200 communicates with the repeater 120 and other LMR devices using a portable RF interface 285. Similarly, the mobile radio 300 communicates with the repeater 120 and other LMR devices using a mobile RF interface 385. The portable and mobile radios 200, 300 may be configured to communicate in an analog or digital mode with Project 25 (P25) radios. The phrase "Project 25 (P25)", as used herein, refers to a set of system standards produced by the Association of Public Safety Communications Officials International (APCO), the National Association of State Telecommunications Directors (NASTD), selected Federal Agencies and the National Communications System (NCS). The P25 set of system standards generally defines digital radio communication system architectures capable of serving the needs of Public Safety and Government organizations. Portable and mobile radios 200, 300 are also generally configured to communicate in analog mode with non-P25 radios using RF interfaces 285, 385.

Portable and mobile radios 200, 300 may be used in a "talk around" mode. "Talk around" mode allows communications between two LMR devices without any intervening equipment, e.g., a repeater, between the two devices. Portable and mobile radios 200, 300 can also be used in a conventional mode where two or more LMR devices communicate through the repeater 120 without trunking. Portable and mobile radios 200, 300 can further be used in a trunked mode where traffic is automatically assigned to one or more voice channels by the repeater 120.

The portable and mobile radios 200, 300 may operate in a single frequency band, or alternatively may operate in a plurality of frequency bands. For example, the RF interfaces 285, 385 may be configured to support analog Frequency Modulation (FM) communications and P25 modulation (digital C4FM) communications in the following bands: 30-50 MHz Very High Frequency (VHF) LOw (LO) band; 136-174 MHz VHF High (Hi) band; 380-520 MHz Ultra High Frequency (UHF) band; and 762-870 MHz band. The portable and mobile radios 200, 300 may also operate in other frequency bands and with other modulation schemes.

The mobile radio 300 may support the same modes of operation and frequency bands on the mobile RF interface 385 as the portable radio 200 supports on the portable RF interface 285. Alternatively, the mobile radio 300 may support either a subset or a superset of the modes and frequency bands supported by the portable radio 200.

The mobile radio 300 and the portable radio 200 may also communicate with one another through a local wireless link 150. The mobile and portable radios 200, 300 interact with the local wireless link 105 through the mobile local wireless interface 305 and the portable local wireless interface 205, respectively. In an exemplary embodiment, communication between the mobile radio 300 and the portable radio 200 via the local wireless link 150 is accomplished using the Bluetooth® protocol. Bluetooth® is well adapted for use in the local wireless link 150 because it is extremely secure in that it employs several layers of data encryption and user authentication measures. Bluetooth® also provides a range of approximately 300 meters. However, alternative technologies may be used for the local wireless link 150. For example, the mobile radio 300 and the portable radio 200 may communicate with one another using short range wireless technologies such as the 802.xx family of wireless communications standards, including Wi-Fi and ZigBee®. Alternatively, longer range wireless technologies such as WiMax, CDMA-1X, UMTS/HSDPA, GSM/GPRS, TDMA/EDGE, EV/DO may be used. The details of these technologies and the hardware required to implement transmitters and receivers that use these technologies are well known to persons skilled in the art, and thus, will not be described in great detail herein.

The portable radio 200 can operate in either "standalone mode" or "remote mode." In standalone mode, the portable radio 200 behaves like a fully functional handheld radio. Specifically, the portable radio 200 communicates with the repeater 120 and other LMR devices directly using the portable RF interface 285. In contrast, in remote mode, the portable radio 200 uses the local wireless link 150 to act as a remote control for the mobile radio 300. When in remote mode, the portable radio 200 uses the more powerful mobile RF interface 385 to transmit and receive data to and from the repeater 120 or another LMR device. Because the mobile radio 300 typically has more power available to it and a larger and more efficient antenna, the portable radio 200 can increase its range dramatically by transmitting and receiving data using the mobile radio's more powerful RF interface.

When the portable radio 200 is in remote mode, the portable radio 200 transmits control parameters to the mobile radio 300 using the local wireless link 150. For example, the portable radio 200 may remotely control the current channel number or the RF output power level used by the mobile radio 300. Similarly, the portable radio 200 can retrieve status information from the mobile radio 300. For instance, the portable radio 200 can retrieve the currently set channel number, the set output power level, and the current state of the mobile radio's battery power.

When in remote mode, audio data is transmitted from portable radio 200 to the mobile radio 300 using the local wireless link 150. The portable radio 200 can employ one or more encoders to encode analog audio signals before transmission to the mobile radio 300. The portable radio 200 can also transmit other data, such as data input from a keyboard, to the mobile radio 300 via the local wireless link 150. The portable radio 200 may encrypt the data that is transmitted to the mobile radio 300. For example, the Bluetooth® protocol provides for encryption of data transmitted using the protocol. The mobile radio 300 decrypts the data, if necessary, and transmits the data using the mobile RF interface 385 to the repeater 120 or to other LMR devices. Similarly, when the portable radio 200 is in remote mode, the mobile radio 300 forwards data received on the mobile RF interface 385 to the portable radio 200 via the local wireless link 150.

To conserve battery power, the portable radio 200 may disable its portable RF interface 285 when in remote mode. The power required to transmit using the local wireless link 150 is generally significantly less than that required to transmit using the portable RF interface 285. Thus, when in remote mode, the portable radio 200 can achieve greater range by taking advantage of the mobile's more powerful RF interface while still using less power than when in standalone mode. This results in a longer talk time available to the portable radio 200.

The portable radio 200 may enter remote mode manually. For example, the portable radio 200 may be equipped with a switch to manually set the mode to standalone or remote. The portable radio 200 may also have a selectable automatic mode selection option.

When the automatic mode selection option is enabled, the portable radio 200 automatically determines which mode, i.e., standalone or remote, is optimal. The portable radio 200 may enter remote mode whenever an acceptable communications link is established between the portable radio 200 and the mobile radio 300 via the local wireless link 150. The portable radio 200 may also measure the signal quality associated with the local wireless link to determine whether to automatically enter or exit the remote mode. To determine the signal quality, the portable radio 200 may monitor the signal strength associated with the wireless link or other signal quality indicators, such as the signal to noise ratio (SNR), bit error rate (BER), frame error rate (FER), and packet error rate (PER), among others. Alternatively, the portable radio 200 may negotiate with the mobile radio 300 to determine which mode is best at any given time. For example, the portable radio 200 may not enter remote mode if the mobile radio 300 reports that the signal it is receiving on its RF interface 385 is weaker than the signal being received by the portable radio's RF interface 285. This could happen, for example, if the mobile radio 300 is in a vehicle that is parked in a garage.

Figure 2:
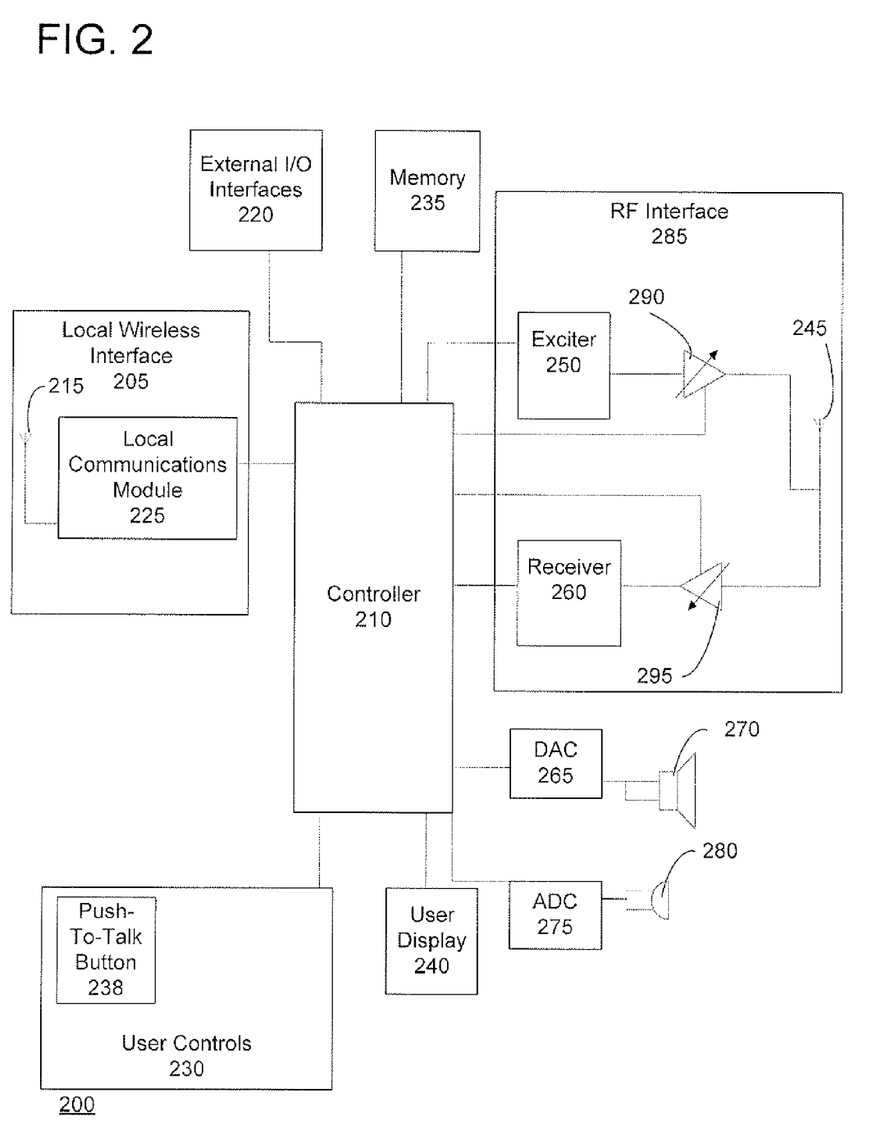
FIG. 2 is a high level block diagram of a portable radio according to the embodiment of the invention.

Referring now to FIG. 2, there is provided a more detailed block diagram of a portable radio 200 in accordance with the embodiment of the present invention. The portable radio 200 is typically a small device, sized to be easily carried by a user. The portable radio 200 is powered by replaceable or rechargeable batteries.

The portable radio 200 includes a controller 210. The controller 210 may include one or more microprocessors, microcontrollers, application-specific integrated circuits (ASICs) and programmable devices, such as a field programmable gate arrays (FPGAs) or complex programmable logic devices (CPLDs). The controller 210 may also have access to memory 235. The memory 235 may include volatile memory, such as static or dynamic RAM, and non-volatile memory, such as ferroelectric memory, magnetoresistive memory, flash memory, or a hard disk drive. The memory 235 may be used to store program instructions (e.g., software code), calibration information, and other information required by the controller 210.

The controller 210 may also connect to one or more external I/O interfaces 220. Examples of external I/O interfaces include ports for USB, serial, Ethernet, and Firewire, among others. Such interfaces are well known to persons skilled in the art, and thus, will not be described in great detail herein. A user can interact with the controller 210 through the External I/O interfaces 220 to upgrade software code and to transfer information to and from the controller 210.

The memory 235 can include a computer-readable storage medium on which is stored one or more sets of instructions (e.g., software code) configured to implement one or more of the methodologies, procedures, or functions described herein. A computer-readable medium containing instructions may also be connected to the controller 210 via one of the external I/O interfaces 220. The instructions can also reside, completely or at least partially, within the controller 210. The controller 210 may execute the program instructions to perform the functions assigned to the controller 210. Alternatively, the methods, procedures or functions described herein can be implemented using dedicated hardware implementations. Thus, the exemplary system is applicable to software, firmware, and hardware implementations.

The portable radio 200 also includes user controls 230. The user controls 230 may include buttons, switches and knobs that a user can use to interact with the controller 210. The user controls 230 typically include a PTT button 238, a channel selector, a frequency band selector, a DTMF keypad, and user definable keys. The user controls 230 may also include a keyboard, which can be used to enter text data to be stored or transmitted.

A user display 240, which provides status information to the user, is also included in the portable radio 200. The user display 240 may include an LCD display, LEDs, and other indication devices. The user display 240 may also output text data that is received by the portable radio 200 from another LMR device or the mobile radio 300.

A speaker 270 and a microphone 280 are also included. Although illustrated in FIG. 2 as a single microphone 280 and speaker 270, multiple speakers and microphones may be included in the portable radio 200. The speaker 270 is connected to the controller 210 via a Digital to Analog Converter (DAC) 265. The DAC 265 converts digital data provided by the controller 210 into an analog signal to be output by the speaker 270. Similarly, the microphone 280 is connected to an Analog to Digital Converter (ADC) 275. The ADC 275 converts the analog outputs of the microphone 280 to digital data. The controller 210 receives the digital data produced by the microphone 280.

The RF interface 285 comprises an exciter 250, an output power amplifier 290, a receiver 260, an input power amplifier 295, and an antenna 245. There are many different possible methods of implementing the RF interface 285. Although FIG. 2 illustrates only a single antenna 245, as is well known in the art, separate transmit and receive antennas may be used. Multiple transmit and/or receive antennas may also be used to provide for diversity transmission and reception and/or beamforming. Each of the exciter 250, the receiver 260, the power amplifiers 290, 295, and the antenna 245, are well known to persons skilled in the art. Thus, these components will not be described in great detail herein. However, a brief discussion of the RF interface 285 architecture is provided to assist a reader in understanding the present invention.

The exciter 250 typically includes a modulator and a local oscillator (not illustrated). The function of the exciter 250 is to modulate data onto an RF signal derived from the local oscillator. The data to be modulated is provided by the controller 210 to the exciter 250. The RF signal, which carries the data, is amplified using the output power amplifier 290 and sent to the antenna 245. The RF signal is thereby broadcast to the repeater 120 and other LMR devices.

The receiver 260 typically includes a demodulator and a second local oscillator (not illustrated). An RF signal is received from the antenna 245 and amplified by the input power amplifier 295. The amplified input RF signal is then demodulated by the receiver 260 using the second local oscillator. Data is thereby extracted from the input RF signal. The extracted data is provided to the controller 210.

The controller 210 sets the frequency of the local oscillators and the gain of the power amplifiers 290, 295. The frequency of the local oscillators is typically defined by the channel that the portable radio 200 is set to. If the portable radio 200 transmits and receives data using the same frequency, the RF interface may include only a single local oscillator (not illustrated) that is shared by the exciter 250 and the receiver 260.

The local wireless interface 205 comprises a local communications module 225 and an antenna 215. The local communications module 225 provides a wireless communications interface for communicating with the mobile radio 300 via the local wireless link 150. In an exemplary embodiment, the local communications module 225 provides an interface that uses the Bluetooth® protocol.

When the portable radio 200 is in standalone mode, the portable controller 210 takes data input by the user through the portable user controls 230 and the portable microphone 280 and uses this data to drive the portable RF interface 285. For example, if the user selects a specific channel using the user controls 230, the controller 210 uses this information to modify the exciter 250 to produce an RF output signal at a frequency that corresponds to the selected channel. Similarly, if a user speaks into the microphone 280, digital audio data is created by the ADC 275 that is encoded by the controller 210 and sent to the exciter 250 to be transmitted to the repeater 120 or other LMR devices. Data retrieved from the receiver 260 is also presented to the user, either as audio played out through the speaker 270 or as information presented to the user via the user display 240.

The portable radio 200 may enter remote mode manually. For example, the user controls 230 may include a dedicated switch used to manually set the mode to standalone or remote. Alternatively, the controller 210 may detect a pattern of button presses of the PTT button 238 and enter the remote mode if a predetermined pattern of button presses is detected. For example, the remote mode may be entered if the user double clicks the PTT button 238, i.e., if the user presses the PTT button 238 two times in quick succession. Other patterns of pressing the PTT button 238 may also be used. For example, the remote mode could be entered if the PTT button 238 is pressed two times in quick succession and then held down for a period of time. Further, the PTT button 238 may also be used to exit the remote mode, i.e., enter the local mode, when the PTT button is pressed a given number of times with a predetermined pattern.

As described above, the portable radio 200 may also include a selectable automatic mode selection option, whereby the mode is switched between remote and standalone automatically by the controller 210. The automatic mode selection option may be enabled by pressing the PTT button 238 multiple times with a predetermined pattern. For example, the selectable automatic mode selection option may be enabled by triple-clicking the PTT button 238. Other methods of enabling the automatic mode selection option, such as the use of a dedicated switch, may also be used.

An indication of the current mode may be provided on the portable radio's user display 240. Alternatively, an audible indication may be provided to the user through the speaker 270 as an indication that the mode has changed. For example, a different audible tone could be output to the user via the speaker 270 upon entering each of the remote mode and the standalone mode. Yet another tone may be supplied to the user if the automatic mode selection option is enabled.

When in remote mode, the controller 210 generally disables the RF interface 285 partially or completely. This is done to preserve battery power. When in remote mode, data provided by the user via the user controls 230 is not sent to the RF interface 285. Instead, this control information is transmitted to the mobile radio 300 via the local wireless link 150 using the local communications module 225. In this manner, a user of the portable radio 200 can remotely control parameters associated with the mobile RF interface 385, such as the power and channel number.

Audio data received from the microphone 280 is also sent to the mobile radio 300 via the local wireless link 150 using the local communications module 225. Audio data may be encoded by the controller 210 into the form needed for transmission using the mobile RF interface 385 before the audio data is transmitted to the mobile radio 300. For example, the controller 210 may encode the audio data using the Improved Multiband Excitation (IMBE) vocoders defined by the P25 standards. Alternatively, the final encoding steps may be performed by the mobile radio 300. For example, the controller 210 may encode the audio data using continuous variable slope delta modulation (CVSD) as defined by the Bluetooth® standard to transmit voice data to the mobile radio 300. In this case, the mobile radio 300 decodes and converts the audio data to the form required for transmission using the mobile RF interface 385.

When the portable radio 200 is in remote mode, the mobile radio 300 forwards data received from the mobile RF interface 385 and provides it to the portable radio 200 via the local wireless link 150. This data is received at the portable radio 200 by the local communications module 225. If the data includes audio data, the audio data is then decoded by the controller 210 and provided to the speaker 270, which outputs the audio data as sound. Similarly, the user display 240 provides status information to the user regarding the mobile radio's RF interface 385. The status information is provided by the mobile radio 300 via the local communications module 225

Some or all of the data transmitted and received using the local communications module 225 may be encrypted. For example, Bluetooth® provides for encryption of data transmitted using the Bluetooth® protocol. However, the data may be further encrypted by the controller 210 using techniques that are well known to those skilled in the art.

When the portable radio 200 is in remote mode, the user controls 230 may control parameters associated with both the portable radio 200 and the mobile radio 300. For example, a user of the portable radio 200 may control the RF channel that the mobile radio 300 is set to and the volume of the speaker 270 on the portable radio 200. Similarly, the user display 240 may provide status information for both the mobile radio 300 and the portable radio 200.

In one embodiment, the portable radio 200 operates in a transparent mode when in remote mode. In this embodiment, changes made to parameters such as the channel number are made to both the mobile radio 300 and to the portable radio 200. In this way, if the portable radio 200 switches between local and remote modes, the user does not need to set the channel number on the portable radio 200 to match the channel number of the mobile radio 300. In other embodiments control of the parameters associated with the portable RF interface 285 and the mobile RF interface 385 are controlled independently even when in remote mode.

Figure 3:
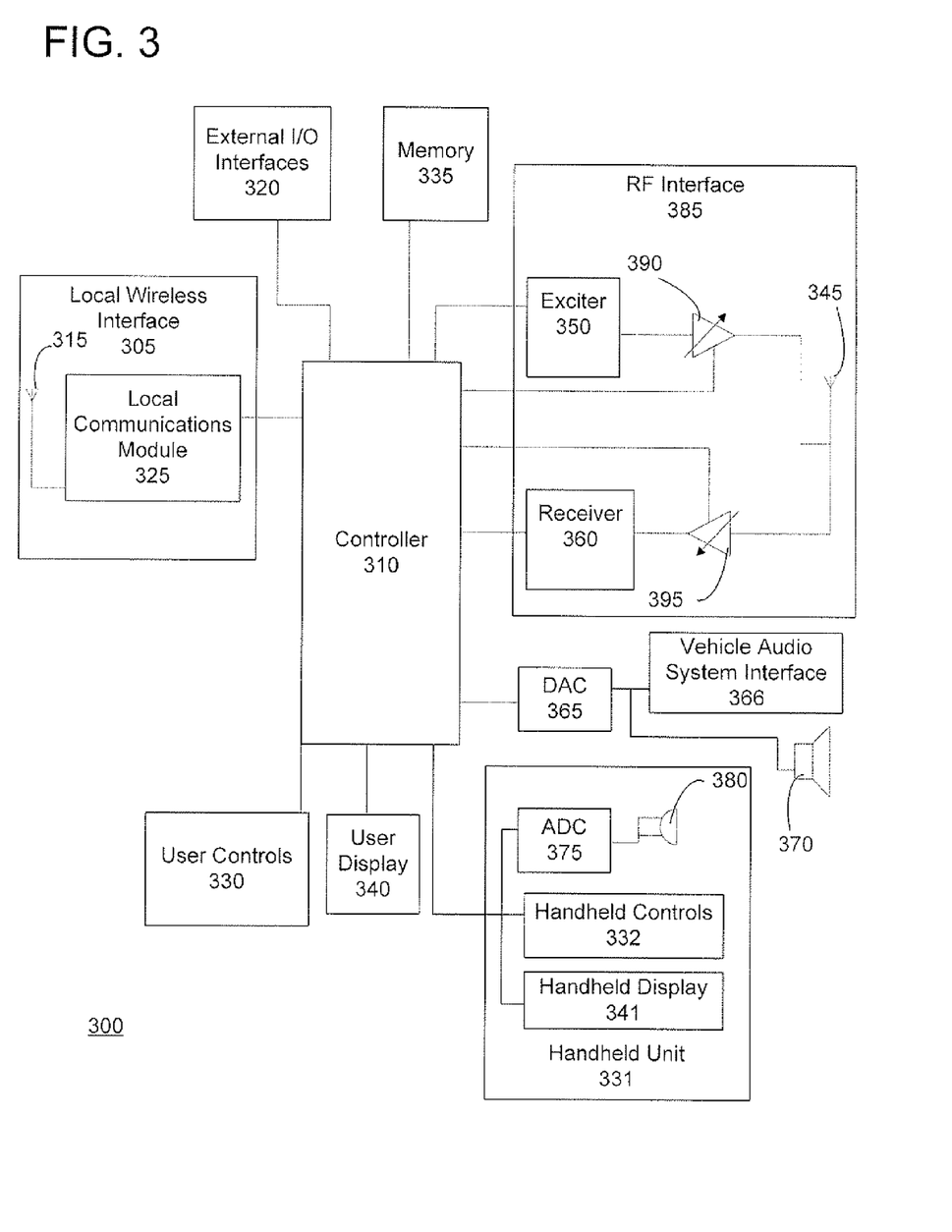
FIG. 3 is a high level block diagram of a mobile radio according to the embodiment of the invention.

Referring now to FIG. 3, there is provided a more detailed block diagram of a mobile radio 300 in accordance with the embodiment of the present invention. The structure of the mobile radio 300 is similar to the structure of portable radio 200. The mobile radio 300, may be embedded in the dashboard of a vehicle. Alternatively, the mobile radio 300 may be embodied in a separate unit or multiple units installed in the vehicle. The mobile radio 300 may be powered by the vehicle's battery. Alternatively, a separate, typically large, power supply may be provided in the vehicle for the mobile radio 300.

Like the portable radio 200, the mobile radio 300 includes a controller 310. The controller 310 may include one or more microprocessors, microcontrollers, application-specific integrated circuits (ASICs), and programmable devices, such as a field programmable gate arrays (FPGAs) or complex programmable logic devices (CPLDs). The controller 310 may also have access to memory 335. The memory 335 may include volatile memory, such as static or dynamic RAM, and non-volatile memory, such as ferroelectric memory, magnetoresistive memory, flash memory, or a hard disk drive. The memory 335 may be used to store program instructions (e.g., software code), calibration information, and other information required by the controller 310.

The controller 310 may also connect to one or more external I/O interfaces 320. Examples of external I/O interfaces include ports for USB, serial, Ethernet, and Firewire, among others. Such interfaces are well known to persons skilled in the art, and thus, will not be described in great detail herein. A user can interact with the controller 310 through the External I/O interfaces 320 to upgrade software code and to transfer information to and from the controller 310. One of the mobile external I/O interfaces 320 may also be used to connect to one of the portable external I/O interfaces 220 to transfer data between the mobile radio 300 and the portable radio 200 and/or to charge the battery of the portable radio 200.

The memory 335 can include a computer-readable storage medium on which is stored one or more sets of instructions (e.g., software code) configured to implement one or more of the methodologies, procedures, or functions described herein. A computer-readable medium containing instructions may also be connected to the controller 310 via one of the external I/O interfaces 320. The instructions can also reside, completely or at least partially, within the controller 310. The controller 310 may execute the program instructions to perform the functions assigned to the controller 310. Alternatively, the methods, procedures or functions described herein can be implemented using dedicated hardware implementations. Thus, the exemplary system is applicable to software, firmware, and hardware implementations.

The mobile radio 300 also includes user controls 330. The user controls 330 may include buttons, switches and knobs that a user can use to interact with the controller 310. The user controls 330 typically include a PTT button, a channel selector, a frequency band selector, a DTMF keypad, and user definable keys. A full keyboard may also be included in the user controls 330. A user display 340 is also included in the mobile radio 300. The user display 340 may include an LCD display, LED's, and other indication devices.

A speaker 370 and a microphone 380 are also included in the mobile radio 300. Although illustrated in FIG. 3 as a single microphone 380 and speaker 370, multiple speakers and microphones may be included in the mobile radio 300. The speaker 370 is connected to controller 310 via a Digital to Analog Converter (DAC) 365. The speaker 370 may be part of the mobile radio 300. Alternatively, as illustrated in FIG. 3, the mobile radio 300 may provide audio to the user via the vehicle's audio system. In this case, the DAC 365 is connected to the vehicle's audio system through the vehicle audio system interface 366. Otherwise, the DAC 365 converts digital samples provided by the controller 310 into analog samples to be output by the speaker 370. Similarly, the microphone 380 is connected to an Analog to Digital Converter (ADC) 375. The ADC 375 converts the analog outputs of the microphone 380 to digital data. The controller 310 receives the digital data produced by the microphone 380.

The mobile radio 300 may also include a handheld unit 331. The handheld unit 331 may include handheld controls 332, such as a PTT button. The handheld unit 331 may also include a handheld display 341, such as an LCD display or LED indicators. The microphone 380 may be included in the handheld unit 331. The handheld unit 331 may be connected to the controller 310 via a wired or a wireless interface.

The RF interface 385 comprises an exciter 350, an output power amplifier 390, a receiver 360 and an input power amplifier 395 and an antenna 345. Although FIG. 3 illustrates only a single antenna 345, as is well known in the art, separate transmit and receive antennas may be used. Multiple transmit and/or receive antennas may also be used in more complicated systems to provide for diversity transmission and reception and/or beam-forming.

There are many different possible methods of implementing the RF interface 385. Each of the exciter 350, the receiver 360, the power amplifiers 390, 395, and the antenna 345, are well known to persons skilled in the art. Thus, these components will not be described in great detail herein. However, a brief discussion of the RF interface 385 architecture is provided to assist a reader in understanding the present invention.

The exciter 350 typically includes a modulator and a local oscillator (not illustrated). The function of the exciter 350 is to modulate data onto an RF signal derived from the local oscillator. The data is provided by the controller 310 to the exciter 350. The RF signal, which carries the data, is amplified using the output power amplifier 390 and sent to the antenna 345. The RF signal is thereby broadcast to the repeater 120 and other LMR devices.

The receiver 360 typically includes a demodulator and a second local oscillator (not illustrated). An RF signal is received from antenna 345 and amplified by input power amplifier 395. The amplified input RF signal is then demodulated by the receiver 360 using the second local oscillator. Data is thereby extracted from the input RF signal. The input data is provided to the controller 310.

The controller 310 sets the frequency of the local oscillators and the gain of the power amplifiers 390, 395. The frequency of the local oscillators is typically defined by the channel that the mobile radio 300 is set to. If the mobile radio transmits and receives data using the same frequency, the RF interface may include only a single local oscillator (not illustrated) that is shared by the exciter 350 and the receiver 360.

The local wireless interface 305 comprises a local communications module 325 and an antenna 315. The local communications module 325 provides a wireless communications interface for communicating with the portable radio 200 via the local wireless link 150. In an exemplary embodiment, local communications module 325 provides an interface that uses the Bluetooth® protocol. Other wireless protocols may be used as long as the protocol used by the mobile radio 300 is compatible with the protocol used by the portable radio 200.

When the portable radio 200 is in standalone mode, the mobile controller 310 takes data input by the user through the mobile user controls 330 and the mobile microphone 380 and uses this data to drive the mobile RF interface 385. For example, if the user changes the RF output power using the user controls 330, the controller 310 uses this information to modify the gain level of the output power amplifier 390. Similarly, if a user speaks into the microphone 380, digital audio data is created by the ADC 375, encoded by the controller 310, and sent to the exciter 350 to be transmitted to the repeater 120 or other LMR devices. Data retrieved from the receiver 360 is also presented to the user, either as audio played out through the speaker 370 or as information presented to the user via the user display 340.

In contrast, when the portable radio 200 in remote mode, the mobile controller 310 allows the portable radio 200 to use the mobile radio's RF interface 385. Before allowing this, the portable radio 200 must first connect to the mobile radio 300. This connection is accomplished via the local wireless link 150. The portable local communications module 225 and the mobile local communications module 325 first negotiate a connection. The negotiation process typically includes authentication procedures that prevent an unauthorized device from connecting to the mobile radio 300. The negotiation process also ensures that the mobile radio 300 and the portable radio 200 are properly paired, i.e., that the portable radio 200 is connected to the correct mobile radio 300. The portable radio 200 may be used with different portable radios 200. Accordingly, the negotiation process is configurable to allow different mobile radio/portable radio pairings. The Bluetooth® protocol provides robust negotiation and connection methods that can be used to pair a mobile radio 300 to a portable radio 200. In addition, the mobile controller 310 and the portable controller 210 may transfer additional data to each other after a connection is established to provide for further security. Negotiation of a wireless connection including security features is well known in the art and will not be described in further detail herein.

When the portable radio 200 is connected to the mobile radio 300 via the local wireless link 150 and the portable radio 200 is in remote mode, data received from the mobile RF interface 385 is forwarded using the local communications module 325 to the portable radio 200 via the local wireless link 150. The data received from the RF interface 385 may also be output via the mobile user display 340 and the mobile speaker 370. This allows a user who is located in the vehicle to monitor received communications from the repeater 120 or other LMR devices.

Similarly, when the portable radio 200 is connected to the mobile radio 300 via the local wireless link 150 and the portable radio 200 is in remote mode, the mobile controller 310 forwards data received from the portable radio 200 via the mobile local communications module 325 to the mobile RF interface 385 for transmission. This data may also be output via the mobile user display 340 and the mobile speaker 370 or the vehicle audio system, to thereby allow a user in the vehicle to monitor communications sent by the portable radio 200. Data received from the portable radio 200 via the local communications module 325 may also be used to set parameters associated with the mobile RF interface 385, such as the channel and output power level.

Even when connected to a portable radio 200 in remote mode, the mobile radio 300 may allow a user located in the vehicle to transmit and receive data using the mobile RF interface. This allows a user located in the vehicle and a remote user located at a distance from the vehicle using the portable radio 200 to effectively share the mobile RF interface. In this case, the mobile microphone 380 and the mobile user controls 330 can be used to provide data to the mobile controller 310 that can be transmitted using the mobile RF interface 385. This data can also be transmitted to the portable radio 200 via the local wireless link 150 to allow the user of the portable radio 200 to monitor communications sent by the mobile radio 300.

In some embodiments, mobile radio 300 can be paired with a plurality of portable radios 200 at the same time. These embodiments allow multiple remote users to share the mobile RF interface 385. In these embodiments, each of the portable radios 200 may not be able to modify all of the parameters associated with the mobile RF interface 385. For example, the portable radios may be able to transmit and receive information using the mobile RF interface 385, but may not be able to change the channel number.

The portable radio 200 may also be paired via the local wireless link 150 to a Keyboard Display Unit (KDU) (not illustrated). A KDU includes a keyboard and a display, which can be used to input and display text data. The KDU may use the Bluetooth® protocol to connect to the mobile radio 300. The KDU can thereby safely transmit text data to the mobile radio 300 by encrypting the data using the Bluetooth® protocol.

Figure 4:
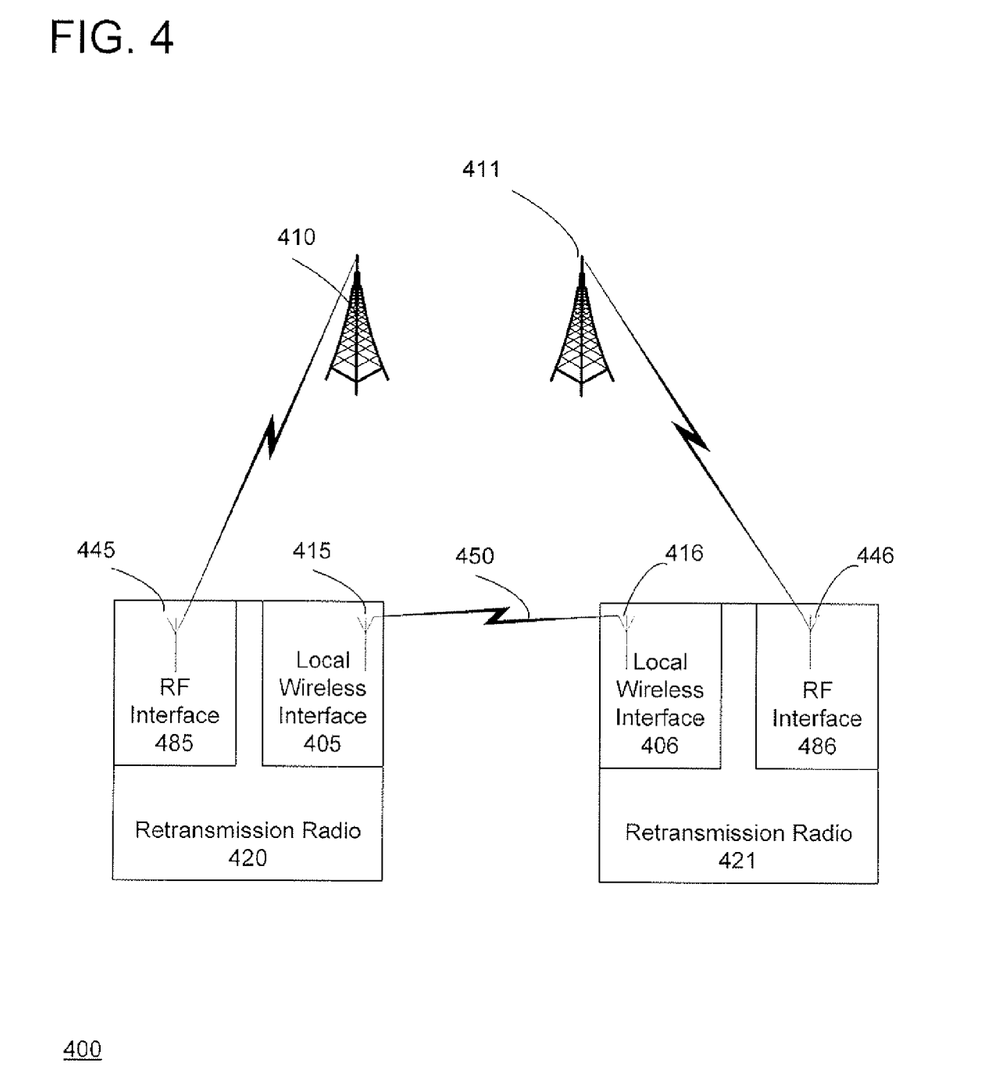
FIG. 4 is a block diagram of a communication system including at least two radios according to another embodiment of the invention.

Referring now to FIG. 4, there is provided a block diagram of a communication system 400 in accordance with another embodiment of the present invention. The communication system includes at least two retransmission radios 420, 421. Each of the retransmission radios 420, 421 includes an RF interface 485,486, an RF antenna 445, 446, a local interface 405, 406, and a local antenna 415, 416. Each of the retransmission radios 420, 421 may include the same components and features as the previously described mobile radio 300. However, the retransmission radios 421, 402 need not be located in a vehicle. The retransmission radios 421, 402 may be located in a fixed location and powered by the AC power grid.

The first retransmission radio 420 and the second retransmission radio 421 are securely paired to one another via the local wireless link 450. In one embodiment, the Bluetooth® protocol is used to securely pair the two retransmission radios 420, 421.

The first retransmission radio 420 receives an RF signal at a first RF frequency from a first device 410 via its RF interface 485. The first retransmission radio 420 decodes the data encoded in the RF signal and transmits the data to the second retransmission radio 421 via the local wireless link 450 using the local interface 405. The data transmitted via the local wireless link 450 may be encrypted. The second retransmission radio 421, receives the decoded data from its local interface 406 and retransmits the information using its RF interface 486 to a second device 411. Typically this transmission occurs at a different RF frequency than the first RF frequency. The system thereby allows data to be securely transferred between two devices operating at different RF frequencies. The system may be bidirectional, also allowing transmission from the second device 411 to the first device 410. An example application for this system is black side retransmission in a military application.

All of the apparatus, methods and algorithms disclosed and claimed herein can be made and executed without undue experimentation in light of the present disclosure. While the invention has been described in terms of preferred embodiments, it will be apparent to those of ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to one of ordinary skill in the art are deemed to be within the spirit, scope and concept of the invention as defined.

What is claimed is:

1. A radio communication system comprising:
a portable radio comprising a portable controller communicatively coupled to: a portable RF interface for transmission and reception of radio signals, a portable local wireless interface, a portable user input device comprising a single push-to-talk button, and a portable user output device; and
a mobile radio comprising a mobile controller communicatively coupled to: a mobile RF interface for transmission and reception of radio signals, and a mobile local wireless interface,
wherein the portable local wireless interface and the mobile local wireless interface are configured to establish a wireless link between the portable radio and the mobile radio, and
wherein the portable controller is programmed to collect user input data from the portable user input device and to provide user output data to the portable user output device for output, and
wherein the portable controller is programmed to selectively facilitate operation of said portable radio in a local mode and in a remote mode, and when operating in the local mode the portable controller is configured to:
  detect a pattern of button presses of the push-to-talk button and begins to operate in the remote mode if the pattern of button presses matches a predetermined pattern;
  control at least one parameter associated with the portable RF interface;
  provide the collected user input data to the portable RF interface for modulation and transmission; and
  receive the user output data from the portable RF interface, the user output data having been extracted by the portable RF interface from an RF signal received by the portable RF interface, and
when operating in the remote mode the portable controller is configured to:
  detect a second pattern of button presses of the push-to-talk button and begins to operate in the local mode if the second pattern of button presses matches a second predetermined pattern;
  at least partially disables the portable RF interface;
  provide the collected user input data to the portable local wireless interface for transmission to the mobile local wireless interface via the wireless link; and
  receive the user output data from the portable local wireless interface, the user output data having been received by the portable local wireless interface from the mobile local wireless interface via the wireless link, and
  provide at least one user determined remote control parameter to the portable local wireless interface for transmission to the mobile local wireless interface via the wireless link,
wherein when the portable controller is operating in the remote mode, the mobile local wireless interface is configured to receive the at least one control parameter transmitted by the mobile wireless interface and provide the received at least one control parameter to the mobile controller, and the mobile controller is configured to determine a user selectable communication channel number to be used by the mobile RF interface based on the received at least one control parameter.

2. The radio communication system of claim 1, wherein when the portable controller is operating in the remote mode, the mobile local wireless interface is further configured to receive the collected user input data transmitted by the portable local wireless interface and provide the received collected user input data to the mobile controller, and the mobile controller is programmed to:
provide the received collected user input data to the mobile RF interface for modulation and transmission;
receive the user output data from the mobile RF interface, the user output data having been extracted by the mobile RF interface from an RF signal received by the mobile RF interface; and
provide the user output data to the mobile local wireless interface for transmission to the portable local wireless interface via the wireless link.

3. The radio communication system of claim 2, wherein the mobile radio further comprises:
a mobile user input device communicatively coupled to the mobile controller; and
a mobile user output device communicatively coupled to the mobile controller, and
wherein when the portable controller is operating in the local mode, the mobile controller is programmed to:
collect mobile user input data from the mobile user input device;
provide the collected mobile user input data to the mobile RF interface for transmission;
receive mobile user output data from the mobile RF interface, the mobile user output data having been extracted by the mobile RF interface from the RF signal received by the mobile RF interface; and
provide the received mobile user output data to the mobile user output device for output.

4. The radio communication system of claim 2, wherein the mobile radio further comprises a mobile user output device communicatively coupled to the mobile controller, and
wherein when the portable controller is operating in the remote mode, the mobile controller is programmed to provide the user output data to the mobile user output device for output.

5. The radio communication system of claim 3, wherein when the portable controller is operating in the remote mode, the mobile controller is programmed to:
collect mobile user input data from the mobile user input device;
provide the collected mobile user input data to the mobile RF interface for transmission; and
provide the user output data to the mobile user output device for output.

6. The radio communication system of claim 1, wherein the portable local wireless interface and the mobile local wireless interface are configured to establish a wireless link between the portable radio and the mobile radio using Bluetooth® protocol.

7. The radio communication system of claim 1, wherein the predefined pattern of button presses is a double-click.

8. The radio communication system of claim 1, wherein the portable user output device is configured to indicate whether the portable controller is operating in the remote mode.

9. The radio communication system of claim 1, wherein the portable controller is programmed to automatically selectively operate in the remote mode if the wireless link is established between the portable radio and the remote radio.

10. The radio communication system of claim 1, wherein the portable controller is programmed to automatically selectively operate in the local mode if the wireless link established between the portable radio and the remote radio is disrupted.

11. The radio communication system of claim 1, wherein the portable controller is programmed to automatically dynamically determine whether to operate in the local mode or the remote mode based upon a signal quality associated with the wireless link established between the portable radio and the mobile remote radio.

12. The radio communication system of claim 1, wherein the mobile local wireless interface is further configured to authenticate the portable radio before establishing the wireless link between the portable radio and the mobile radio.

13. The radio communication system of claim 2, wherein the portable local wireless interface is further configured to encrypt the collected user input data before transmission and the mobile local wireless interface is further configured to decrypt the received collected user input data.

14. The radio communication system of claim 2, wherein the mobile local wireless interface is further configured to encrypt the user output data before transmission and the portable local wireless interface is further operative to decrypt the received user output data.

15. A portable radio comprising a portable controller communicatively coupled to: a portable RF interface, a portable local wireless interface, a portable user input device comprising a single push-to-talk button, and a portable user output device,
wherein the portable controller is programmed to collect user input data from the portable user input device and to provide user output data to the portable user output device for output, and
wherein the portable local wireless interface is configured to establish a wireless link between the portable radio and a mobile radio, and
wherein the portable controller is programmed to selectively facilitate operation of said portable radio in a local mode and a remote mode, and when operating in the local mode the portable controller is configured to:
detect a pattern of button presses of the push-to-talk button and begin to operate in the remote mode if the pattern of button presses matches a predetermined pattern;
control at least one parameter associated with the portable RF interface;
provide the collected user input data to the portable RF interface for transmission; and
receive the user output data from the portable RF interface, the user output data having been extracted by the portable RF interface from an RF signal received by the portable RF interface, and
when operating in the remote mode the portable controller is configured to:
detect a second pattern of button presses of the push-to-talk button and begin to operate in the local mode if the second pattern of button presses matches a second predetermined pattern;
at least partially disables the portable RF interface;
provide the collected user input data to the portable local wireless interface for transmission to the mobile local wireless interface via the wireless link to facilitate subsequent re-transmission of the collected user input data by the mobile RF interface;
receive the user output data from the portable local wireless interface, the user output data having been received by the portable local wireless interface from the mobile local wireless interface via the wireless link, after having been extracted from an RF signal by the mobile RF interface, automatically provide at least one user determined control parameter associated with the portable radio to the portable local wireless interface for transmission to the mobile radio, wherein said control parameter specifies a user selectable setting of said portable radio which is to be automatically applied to said mobile radio when the portable radio is operated in said remote mode.

16. The radio communication system of claim 15, wherein the portable controller is programmed to automatically selectively determine whether to operate in the local mode or the remote mode based upon a signal strength associated with the wireless link established between the portable radio and the mobile remote radio.

17. The radio communication system of claim 15, wherein the portable local wireless interface is further configured to encrypt the collected user input data before transmission.

18. The radio communication system of claim 15, wherein the portable user input device further comprises a microphone and the portable user output device is a speaker.

19. The radio communication system of claim 15, wherein said user selectable setting is a communication channel number.

20. The radio communication system of claim 15, wherein portable radio is configured to receive a channel selection status information communicated from said mobile radio to said portable radio, and to display said channel selection status information at said portable radio.

* * * * *